United States Patent
Engwer et al.

(10) Patent No.: US 7,082,114 B1
(45) Date of Patent: Jul. 25, 2006

(54) SYSTEM AND METHOD FOR A WIRELESS UNIT ACQUIRING A NEW INTERNET PROTOCOL ADDRESS WHEN ROAMING BETWEEN TWO SUBNETS

(75) Inventors: Darwin A. Engwer, Pleasanton, CA (US); Jonathan M. Zweig, Cupertino, CA (US); Paul McDaid, Galway (IE)

(73) Assignee: Nortel Networks Limited, St. Laurent (CA)

( * ) Notice: Subject to any disclaimer, the term of this patent is extended or adjusted under 35 U.S.C. 154(b) by 678 days.

(21) Appl. No.: 09/753,218

(22) Filed: Dec. 28, 2000

Related U.S. Application Data

(60) Provisional application No. 60/226,464, filed on Aug. 18, 2000.

(51) Int. Cl.
*H04Q 7/00* (2006.01)

(52) U.S. Cl. .................. 370/331; 370/338; 455/437; 455/442

(58) Field of Classification Search ........ 370/331–332, 370/338, 349; 455/437, 440, 432.1, 436
See application file for complete search history.

(56) References Cited

U.S. PATENT DOCUMENTS

| | | | |
|---|---|---|---|
| 5,901,362 A * | 5/1999 | Cheung et al. ............. | 455/525 |
| 5,987,062 A | 11/1999 | Engwer et al. | |
| 6,058,106 A * | 5/2000 | Cudak et al. ............... | 370/313 |
| 6,370,381 B1 * | 4/2002 | Minnick et al. ............ | 455/445 |
| 6,535,493 B1 * | 3/2003 | Lee et al. .................... | 370/329 |
| 6,577,609 B1 * | 6/2003 | Sharony ..................... | 370/312 |
| 6,580,700 B1 * | 6/2003 | Pinard et al. ............... | 370/332 |
| 6,690,659 B1 * | 2/2004 | Ahmed et al. .............. | 370/328 |

(Continued)

OTHER PUBLICATIONS

Chi-Chun Lo, et al. "QoS provisioning in handoff algorithms for wireless LAN", International Zurich Seminar on Broadband Communications. Accessing, Transmission, Networking, Feb. 17, 1998, pp. 9-16, XP002151137.

(Continued)

*Primary Examiner*—Chau Nguyen
*Assistant Examiner*—Tri H. Phan
(74) *Attorney, Agent, or Firm*—Blakely Sokoloff Taylor & Zafman, LLP

(57) ABSTRACT

In a wireless network system having a wired backbone network with two or more sub-networks, each having one or more access points for communicating with wireless units via a wireless transmission medium, a system, apparatus and method for a wireless unit to determine whether a candidate access point is on a different sub-network than its current access point. If the wireless unit determines that the candidate access point is on a different sub-network, then the wireless unit releases its current network protocol address which was valid for the current sub-network, and obtains a new network protocol address valid for the new sub-network. This is accomplished by the candidate access point transmitting a multicast packet that includes the network protocol address of the access point and the subnet mask of the sub-network which the access point is on. By receiving this multicast packet, the wireless unit can determine if the candidate access point is on a different sub-network than its current sub-network. Also disclosed is a technique for a wireless unit to determine whether to roam to a candidate access point based on the signal qualities to its current and candidate access points, and whether the candidate access point is on a different sub-network or a designated restricted sub-network.

21 Claims, 6 Drawing Sheets

U.S. PATENT DOCUMENTS 6,701,361 B1 * 3/2004 Meier .................... 709/224

OTHER PUBLICATIONS

"IEEE standard for information technology-telecommunications and information exchange between systems-local and metropolitan area networks-specific requirement. Part 11: wireless LAN medium access control (MAC) and physical layer (PHY) specification. (ISO/IEC 8802-11, ANSI/IEEE Std 802.11-1999)" Aug. 20, 1999, pp. 38-54, XP002206839.

* cited by examiner

SYSTEM AND METHOD FOR A WIRELESS UNIT ACQUIRING A NEW INTERNET PROTOCOL ADDRESS WHEN ROAMING BETWEEN TWO SUBNETS

This application claims benefit of U.S. Provisional Application No. 60/226,464 filed Aug. 18, 2000.

FIELD OF THE INVENTION

The present invention relates generally to the field of networking. In particular, this invention relates to a system and method in a wireless network system for a wireless unit (WU) to automatically obtain a new and valid network Protocol address when the wireless unit (WU) roams from an AP associated with a first sub-network to an AP associated with a second sub-network.

BACKGROUND OF THE INVENTION

The ability of users to access programs and share data over local area networks (referred to as "LANs") has become a necessity for most working environments. To improve efficiency and ease of use, certain enhancements may be added to a LAN such as remote wireless access. By providing remote wireless access, a wireless LAN (WLAN) is formed.

As described in U.S. Pat. No. 5,987,062 issued to Netwave Technologies, Inc., now owned by Nortel Networks Limited of Ontario, Canada, one type of WLAN employs dedicated stations, which are referred to as access points (APs). Therein, each AP is a relay station that includes a radio frequency (RF) transceiver that receives radio data packets from a mobile unit (MU) such as a notebook-type computer with a suitable adapter card as described in U.S. Pat. No. 5,987,062. Thereafter, the AP transmits the data packets to the fixed backbone network. Of course, the AP may receive data from the fixed backbone network and transmit it to one or more mobile units.

Before data transmission can occur between the fixed backbone network and an MU by way of an AP, the AP must first authenticate the MU. The authentication is accomplished by the MU transmitting a request for authentication message to the AP, and the AP sending back a successful authentication message back to the MU. Once the MU has been authenticated, the MU has to associate itself with the AP. The association is accomplished by the MU transmitting a request for association message to the AP, and the AP sending back in a successful association message. The authentication and association transmissions are specified in the Institute of Electrical and Electronics Engineers (IEEE) 802.11 standard. Once the MU has been properly authenticated and associated with the AP, then data transmission between the MU and the fixed backbone network can occur.

A problem with the current wireless network system deals with systems that have more than one sub-network and roaming of MUs can occur between two or more sub-networks. Specifically, when an MU becomes authenticated and associated with a particular AP, the sub-network to which the AP is attached dynamically assigns a network protocol address to the MU. The assigned network protocol address is only valid for that sub-network. It is not valid for other sub-network(s) of the wireless network system. Thus, if the MU were now to roam to a new AP associated with another sub-network, the previously-assigned network protocol address for the MU is no longer valid for the new sub-network. In this situation, the MU can transmit data to the new sub-network, but data transmitted back to the MU ends up being routed to the original sub-network, which the MU is no longer associated with. Thus, the MU would not receive the data addressed to it.

A known prior art technique that deals with this specific problem is known in the art as "mobile IP." A wireless network system that uses "mobile IP" includes a sub-network that has specialized devices that will forward data to an MU when it roams to a new sub-network. However, a "mobile IP" system is typically very complex, requires a very comprehensive set-up, and is not widely available.

Thus, there is a need for a system and method in a wireless network system for an MU (deemed herein as a wireless unit (WU) since an MU need not be mobile) to automatically obtain a new and valid network Protocol address when the wireless unit (WU) roams from an AP associated with a first sub-network to an AP associated with a second sub-network. Such a system and method is provided herein in accordance with the invention.

SUMMARY OF THE INVENTION

An aspect of the invention is a technique for a wireless unit in a wireless network system to determine whether a candidate access point is on different sub-network than the sub-network which the wireless unit is currently associated with. If the wireless unit determines that the candidate access point is on a different sub-network, then the wireless unit releases its current network protocol address which was valid for the current sub-network, and obtains a new network protocol address valid for the new sub-network. This is accomplished by the candidate access point transmitting a multicast packet that includes the network protocol address of the access point and the subnet mask of the sub-network which the access point is on. By receiving this multicast packet, the wireless unit can determine if the candidate access point is on a different sub-network than its current sub-network.

Another aspect of the invention is a technique for a wireless unit to determine whether to roam to a candidate access point based on the signal qualities to its current and candidate access points, and whether the candidate access point is on a different sub-network. In a first mode, the wireless unit makes its decision to roam to the candidate access point if the signal quality of the wireless link to the candidate access point is better than the signal quality of the wireless link to the current access point. In a second mode, the wireless unit makes its decision to roam to the candidate access point if the signal quality of the wireless link to the candidate access point is a factor better than the signal quality of the wireless link to the current access point, if the candidate access point is on a different sub-network. In a third mode, the wireless unit is prevented from roaming to an access point on a different sub-network, regardless of signal quality and/or other factors. In a fourth mode, the wireless unit is restricted as in the second mode or prevented as in the third mode from roaming to an access point on a particular sub-network, yet can roam freely between access points on other different sub-networks.

Other aspects and features of the present invention will become apparent to those ordinarily skilled in the art upon review of the following description of specific embodiments of the invention in conjunction with the accompanying figures.

DETAILED DESCRIPTION OF THE INVENTION

Herein, the exemplary embodiments of the present invention relate to a wireless network system that includes a fixed wired backbone network, one or more access points (AP) for providing wireless units (WUs) access to the backbone network via a wireless communications link to the AP. And, in particular, the exemplary embodiments of the invention relate to a system and method for a wireless unit (WU) to automatically obtain a new and valid network protocol address when the wireless unit (WU) detects that it has roamed from an AP associated with a first sub-network to an AP associated with a second sub-network.

In the following description, certain terminology is used to describe features of the present invention. For example, "logic" includes hardware and/or software module(s) that perform a certain function on incoming information. A "software module" is executable code such as an operating system, an application or an applet for example. The term "information" is defined as data, address, and/or control. For transmission, the information may be placed in a frame featuring a single data packet or a series of data packets.

In addition, a "link" is broadly defined as one or more information-carrying mediums to establish a communications pathway. Examples of the medium include a physical medium (e.g., electrical wire, optical fiber, cable, bus traces, etc.) or a wireless medium (e.g., air in combination with wireless signaling technology).

Figure 1:
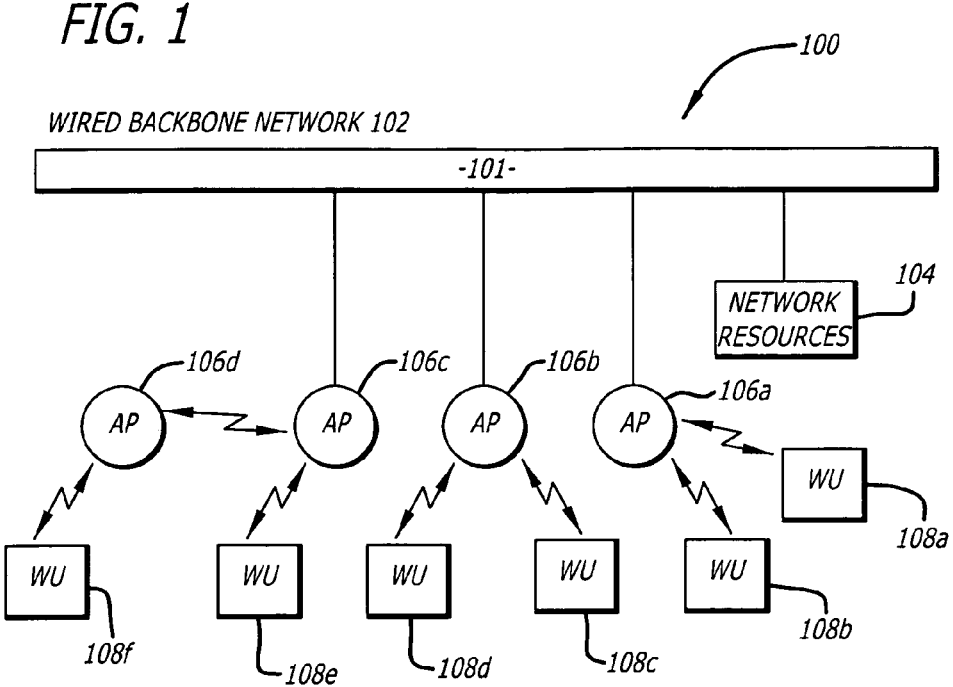
FIG. 1 illustrates a block diagram an exemplary wireless network system in accordance with the invention.

Referring to FIG. 1, an exemplary first embodiment of a wireless network system 100 in accordance with the invention is illustrated. The wireless network system 100 comprises a link 101 based on a physical medium. Herein, the link 101 is part of a wired backbone network 102 that includes network resources 104 available for users of the system 100. The wireless network system 100 further includes one or more access points (APs) 106a–106d that communicate via a wireless link with one or more wireless units (WUs) 108a–108f. For this embodiment, four (4) APs 106a–106d communicate with six (6) WU 108a–108f.

Users using the WUs 108a–108f can access the network resources 104 via any of the APs 106a–106d, which are generally transparent bridges that link a wireless network defined by one or more WUs 108a–108f with the wired backbone network 102. The WUs 108a–108f communicate with the APs 106a–106d typically using a standardized protocol, such as the IEEE 802.11 protocol.

A "wireless unit" (WU) is defined herein as any electronic device comprising processing logic (e.g., a processor, microcontroller, state machine, etc.) and a wireless transceiver for receiving and transmitting data to an access point (AP) or another wireless unit (WU) Examples of a WU include a computer (e.g., desktop computer, laptop computer, handheld computer such as a personal digital assistant "PDA", etc.), communications equipment (e.g., pagers, telephones, facsimile machine, etc.), a television set-top box, or appliances such as refrigerator pads, electronic picture frames, alarm detectors, water detectors, etc.

An "access point" (AP) is a device that provides a bi-directional connection between one or more WUs and the wired backbone network 102. However, an AP could also have a wireless connection back to the backbone network 102, such as AP 106d, which has a wireless link to the backbone network 102 via another AP 106c. The wired backbone network can be of any type, including an Ethernet, a token ring, and an asynchronous transfer mode (ATM) network. The AP of the invention includes hardware and/or software to detect a failed communications link to the wired backbone network.

Figure 2:
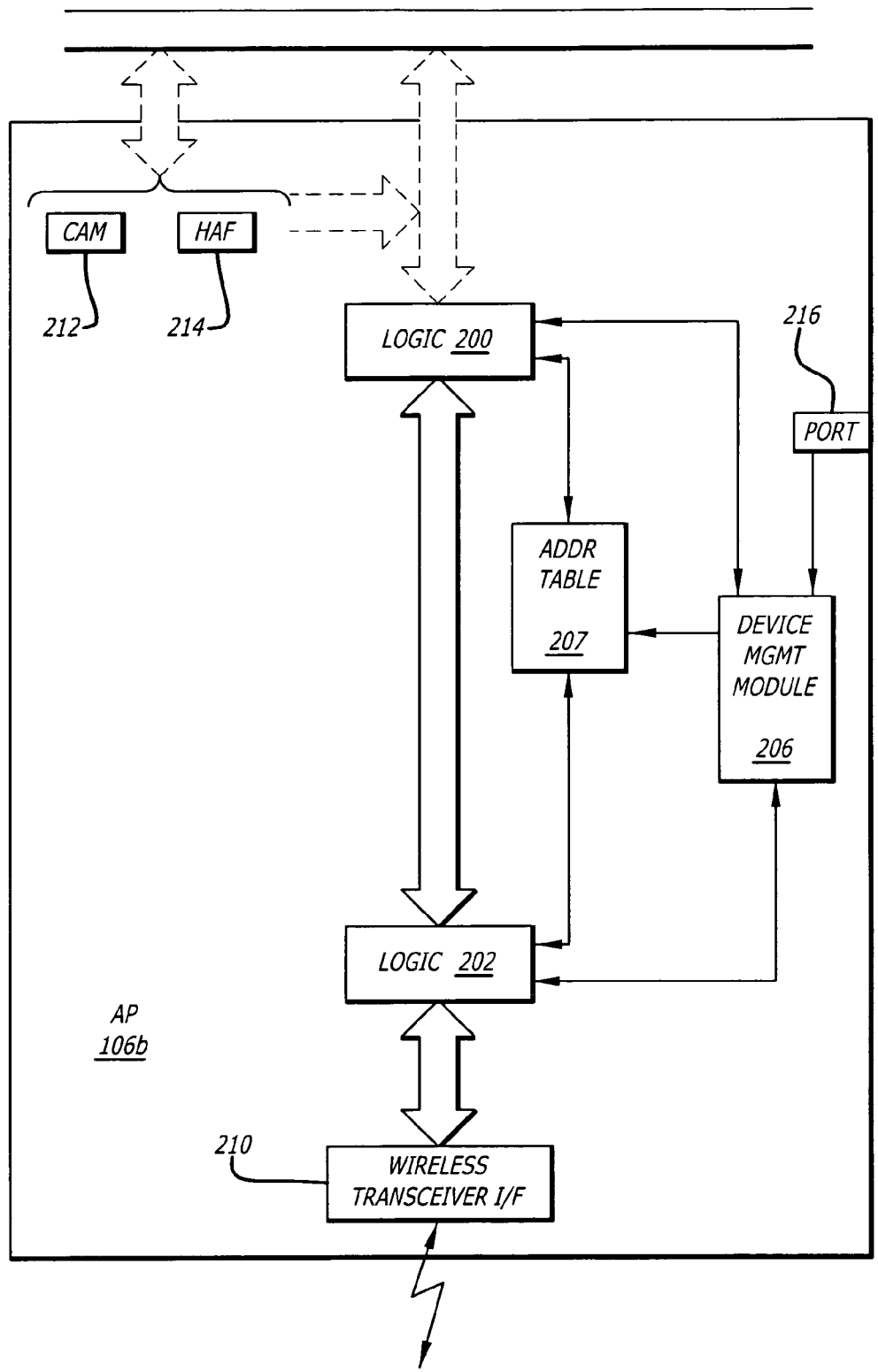
FIG. 2 illustrates a block diagram of an exemplary access point (AP) in accordance with the invention.

Referring now to FIG. 2, an exemplary embodiment of an access point (AP) is shown. For illustrative purposes, the access point is represented by AP 106b and differs in function from the access points described in U.S. Pat. No. 5,987,062. As shown, AP 106b comprises logic 200 and 202, an address table 204, a device management module 206, and a wireless transceiver interface 210. In particular, the logic 200 is used to determine whether certain information from the wired backbone network 102 is destined for one or more of the WUs. The address table 204 includes media access control (MAC) addresses for all of the wireless units associated with the AP 106b such as WUs 108c–d of FIG. 1. In the special case of all broadcast or some multicast packets, the packets are addressed to all or some of the wireless units (WUs) associated with the access point (AP) on a "best effort" basis.

Similarly, as information from wireless units (WU) is received by the wireless transceiver 210, the logic 202 monitors addresses within this information against the contents of the address table 204. One reason is that only information from authenticated and associated wireless units (e.g., WUs 108c–d) is accepted. Hence, if a non-authenticated wireless unit transmits packets, these packets will not be forwarded to the wired backbone network 102 of FIG. 1. The logic 202 subsequently transmits the information to the logic 200 for routing to the wired backbone network 102.

In the event that the fixed backbone network 102 of FIG. 1 has a substantially larger data rate than the wireless network, content addressable memory (CAM) 212 and a hardware address filter (HAF) 214 are employed within the AP 106b. The CAM 212 and HAF 214 are in communication with the fixed backbone network 102 and collectively filter information at the hardware level so that the logic 200 processes only a small portion of the information routed over the wired backbone network 102.

The device management module 206 provides a mechanism for adjusting the various parameters and controlling the functionality of the AP 106b. An example of one mechanism involves placement of an interface port 216 (e.g. serial port) within the AP 106b. The interface port 216 provides a direct connection to the AP 106b. Other mechanisms include (1) Simple Network Management Protocol (SNMP) management tools such as OPTIVITY® by Nortel Networks Limited of Montreal, Canada, (2) a TELNET or (3) web-based management software.

As will be discussed in more detail later, the AP 106b of the invention includes a logic circuit, such as the device management module 206, for transmitting a multicast message to one or more WUs for informing such of the AP's network protocol address and subnet masks. The WU(s) that receive this information from a candidate AP (a candidate AP is one to which a WU is considering roaming) can determine or assume that the candidate AP is on a different sub-network than the current AP in which the WU is associated with. And, if the WU makes a decision to roam to the candidate AP, the WU generates a request for release of its current network protocol address on the subnet of its current AP, disassociates itself from its current AP, associates and authenticates itself with the candidate AP, and a request for a new network protocol address on the subnet of its candidate AP. Each AP includes a logic circuit, such as the device management module 206, for receiving these request messages from a WU and transmitting them to a corresponding server, such as a Dynamic Host Configuration Protocol (DHCP) server who performs the release or renewal of the network protocol address for the WU.

The AP 106b of the invention also includes a logic circuit, such as the device management module 206, for sending load balancing and signal quality information to one or more WUs, so that a WU can make roaming decisions based on this information and information about whether a candidate AP is on a different network. The AP 106 includes a logic circuit, such as the device management module 206, for sending a multicast message to one or more WUs including additional information that can be used by WUs to make roaming decisions. This information may include the physical location of the AP, permitted users of the sub-network the AP is on, etc. More to follow regarding the AP's functions with regard to the invention.

Referring back to FIG. 1, in a typical scenario, a WU associates itself with one of the APs to communicate with the wired backbone network 102. For instance, in the example shown in FIG. 1, WUs 108a–b are associated with AP 106a, WUs 108c–d are associated with AP 106b, WU 108e is associated with AP 106c, and WU 108f is associated with wireless AP 106d. Which access point (AP) a wireless unit (WU) is associated with can depend on many factors, including signal quality, load balancing, restricted links and other factors. The WUs associated with a particular AP can change, such as when the WU "roams" from the coverage area of a particular AP to a coverage area of another AP. From the standpoint of the user using the WU, this change in associated AP is transparent.

Figure 3:
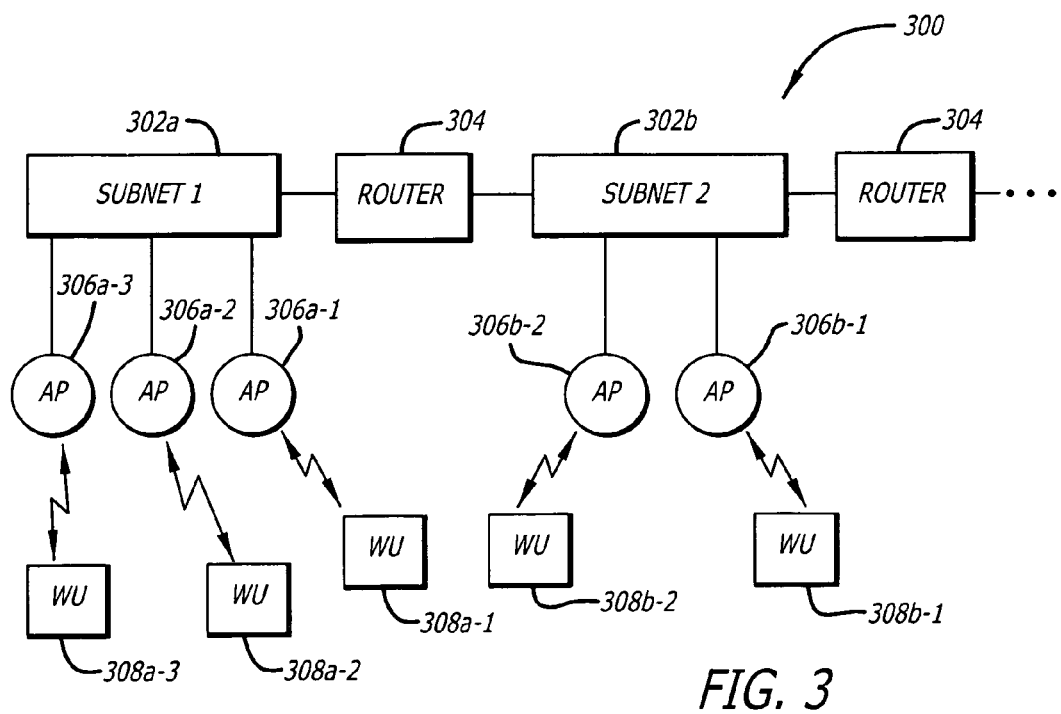
FIG. 3 illustrates a block diagram of another wireless network system that includes more than one sub-network in accordance with the invention.

FIG. 3 illustrates an exemplary second embodiment of a wireless network system 300 in accordance with the invention. The wireless network system 300 comprises two or more sub-networks 302a–b, which communicate with each other by way of a network device, such as router 304. The sub-networks 302a–b can be any wired backbone network, including Ethernet, token ring, and an asynchronous transfer mode (ATM) network. The sub-networks 302a–302b need not be of the same type, for instance, sub-network 302a can be an Ethernet, and sub-network 302b can be a token ring. Each sub-network 302a–b has one or more APs for communicating with associated WUs. For instance, sub-network 302a includes APs 306a-1, 306a-2, 306a-3 for communicating respectively with WUs 308a-1, 308a-2, and 308a-3. Sub-network 302b includes APs 306b-1 and 306b-2 for communicating respectively with WUs 308b-1 and 308b-2. In this system, a WU associated with an AP on a particular sub-network (e.g. sub-network 302a) can also change its association to an AP on another sub-network (e.g. sub-network 302b) by roaming as discussed above or other circumstances.

As previously discussed, a problem with the current wireless network system deals with systems that have more than one sub-network and roaming of WUs can occur between two or more sub-networks. Specifically, when a WU becomes authenticated and associated with a particular AP, a DHCP server on the sub-network to which the AP is on dynamically assigns a network protocol address (e.g. Internet Protocol (IP) address) to the WU in response to a request made by the WU. The assigned network protocol address is only valid for that sub-network. It is not valid for other sub-networks of the wireless network system. Thus, if the WU were now to roam to a new AP associated with another sub-network, the previously-assigned network protocol address for the WU is no longer valid for the new sub-network. In this situation, the WU can transmit data to the new sub-network, but data transmitted back to the WU ends up being routed to the original sub-network, which the WU is no longer associated with. Thus, the WU would not receive the data addressed to it.

Figure 4A:
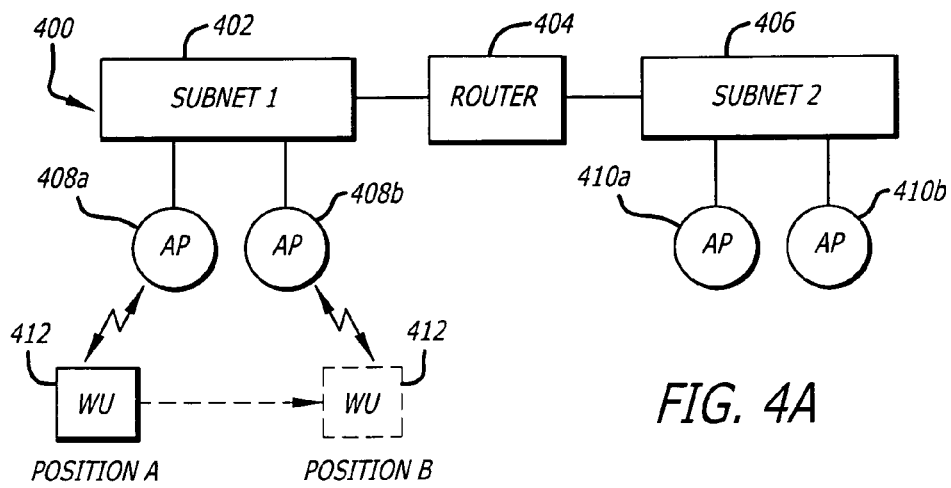
FIGS. 4A–C illustrates a block diagram of an exemplary wireless network system that includes two sub-networks and a WU roaming through various APs on both sub-networks in accordance with the invention.

FIG. 4A illustrates a block diagram of an exemplary wireless network system 400 that includes more than one sub-network. Specifically, the wireless network system 400 comprises a first sub-network 402 coupled to a second sub-network 406 by way of a network device, such as router 404. Sub-network 402 includes APs 408a–b for communicating with one or more WUs, such as WU 412. Likewise, sub-network 406 also includes APs 410a–b for communicating with one or more WUs. In the example system 400 shown in FIG. 4A, WU 412 is initially in position "A" and is associated with AP 408a for communicating with sub-network 402. When WU 412 is initially authenticated and associated with AP 408a, a network protocol address is dynamically assigned to WU 412 for the purpose of transmitting data to the WU. When WU 412 roams from position "A" to position "B", WU 412 becomes authenticated by and associated with a new AP 408b. Since the newly associated AP 408b is on the same sub-network 402 as the original AP 408a, the network protocol address previously assigned to WU 412 is still valid, and can be used to transmit data to the WU 412 via AP 408b.

Figure 4B:
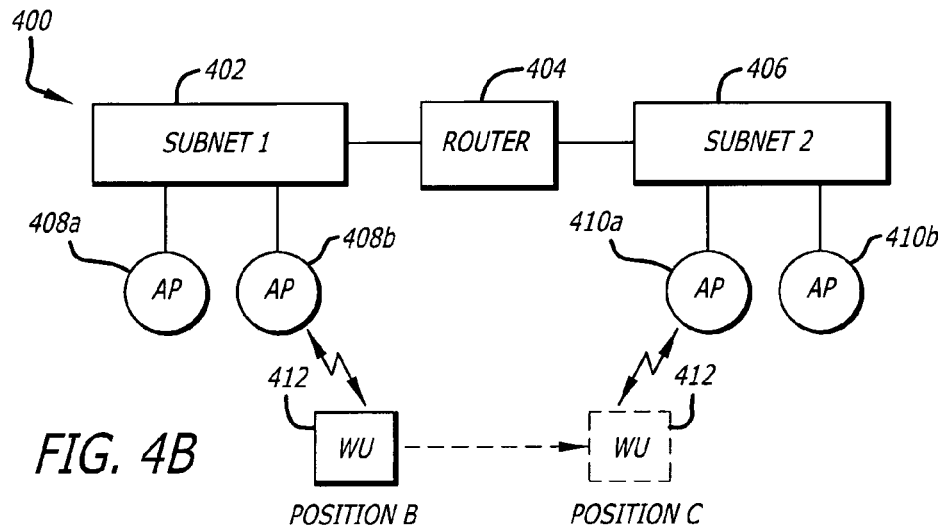

FIG. 4B illustrates a block diagram of the exemplary wireless network system 400 illustrating the system's response when a WU roams between APs on different sub-networks. In the example illustrated in FIG. 4B, the WU is now in position "B" and is associated with AP 408b for communicating with sub-network 402. Further, WU 412 has been assigned a network protocol address that is valid for sub-network 402. When WU 412 roams from position "B" to position "C", WU 412 becomes authenticated by and associated with a new AP 410a of sub-network 406. Since the new AP 410*a* is on a different sub-network 406 than sub-network 402 to which the AP 410*a* is on, the network protocol address previously assigned to WU 412 is no longer valid. Therefore, the WU 412 can transmit data to the sub-networks 402 and 406 through AP 410*a*, but any data sent to the WU 412 would be routed to sub-network 402 because of its previously-assigned network protocol address. Since WU 412 is no longer associated with sub-network 402, WU 412 will not receive the data.

The invention solves this problem by having each of the APs of the wireless network system 400 periodically send out a multicast data packet that includes the network protocol address of the transmitting AP and a subnet mask. A WU that receives the multicast data packet stores the MAC address of the AP and the network protocol address information of the AP and subnet mask. When the WU moves within the coverage area of a candidate AP that is on a different sub-network, the WU begins to receive the multicast data packet from the AP that provides its network protocol address and subnet mask. If the WU has never roamed to any of the APs on that different sub-network, it will not find that information stored in its memory.

The WU, therefore, assumes that the AP is on a different sub-network and performs a routine for releasing its current network protocol address and obtaining a new network protocol address valid for the new sub-network, using for example a Dynamic Host Configuration Protocol (DHCP). In the case that the WU has previously roamed to the new sub-network, the network protocol address of the APs of the new sub-network are in the WU's memory. With that information, the WU knows that the AP is on a new sub-network and initiates the release and renewal of the network protocol address. This will be explained further with reference to FIGS. 4A–C.

Referring back to FIG. 4A, when WU 412 is in position "A" and is associated with AP 408*a*, it receives the multicast data packets of all the APs on sub-network 402. This is because the multicast data packet from a single AP are transmitted to all of the APs on the same sub-network, which in turn, transmit the packet through the wireless medium. Thus, when WU 412 roams from position "A" to position "B", WU 412 already knows the network protocol address and subnet mask for AP 408*b* because it stores this information as it receives it. Therefore, the WU 412 can determine that AP 408*b* is on the same sub-network (i.e. sub-network 402) that AP 408*a* is on, and therefore, the WU 412 need not obtain a new network protocol address since the one previously assigned to it, is also valid for AP 408*b*.

Referring now to FIG. 4B, when WU 412 moves from position "B" toward position "C" and approaches AP 410*a*, WU 412 begins to receive beacons from AP 410*a*. In this example, WU 412 has never roamed within a session (a session being preferably the time between a WU being turned on and then turned off) to any AP on sub-network 406. Therefore, WU 412 has not previously stored the network protocol address and subnet mask of AP 410*a*. In this case, WU 412 assumes that AP 410*a* is on a different sub-network, and then releases its previously assigned network address protocol that was valid for sub-network 402 and obtains a new network address protocol valid for sub-network 406 using for example DHCP.

Figure 4C:
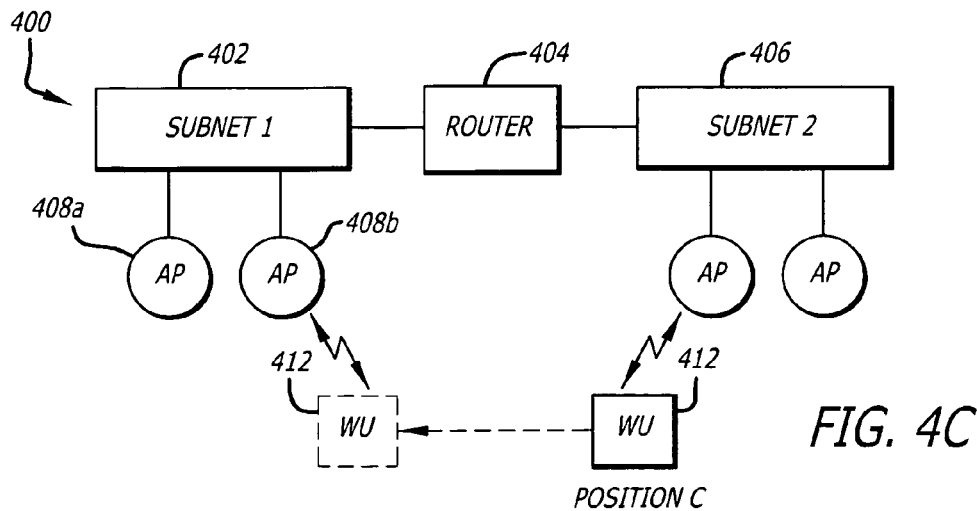

Referring now to FIG. 4C, when WU 412 moves from position "C" back towards position "B" and approaches AP 408*b*, WU 412 begins to receive beacons from AP 408*b*. Since, in this example, WU 412 has previously roamed to AP 408*b* (see FIG. 4B), WU 412 has already stored the MAC address, network address, and subnet mask of AP 408*b*.

Therefore, WU 412 knows that it is going to be changing sub-networks, and therefore releases its previously assigned network address valid only for sub-network 406 and obtains a new network address valid for sub-network 402 using for example DHCP.

In the preferred embodiment, the multicast data packet sent out by the APs conform to an Inter Access Point Protocol (IAPP) developed by Netwave Technologies, Inc., now owned by Nortel Networks Limited. The IAPP protocol is used for automated hop sequence between APs, handover notification when a WU roams from one AP to another AP, and for delivery of various AP information, such as the AP network protocol address and subnet mask as previously discussed. The IAPP uses an IEEE 802.3 frame format with the sub-network access protocol (SNAP). The IAPP broadcast packet includes a header defining various parameters such as destination MAC address which is typically set to a multicast address, a source address set to the MAC address of the transmitting AP, length of the packet, and other information, and a payload which includes informational elements such as the AP name, load balancing information, and the network protocol address and subnet mask of the AP.

Figure 5:
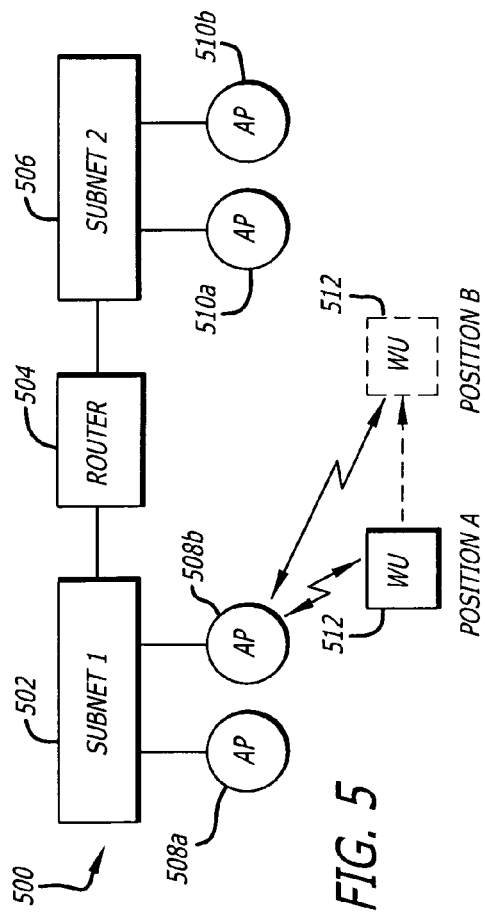
FIG. 5 illustrates a block diagram of an exemplary wireless network system that includes two sub-networks and a WU roaming within the ranges common to two APs on different sub-networks in accordance with the invention.

FIG. 5 illustrates a block diagram of another exemplary wireless network system 500 that includes multiple sub-networks. The wireless network system 500 is used to illustrate another aspect of the invention. Specifically, the wireless network system 500 comprises a first sub-network 502, a second sub-network 506, and a network device such as router 504 data coupling the two sub-networks. Each sub-network has one or more APs for communicating with associated WUs. For instance, sub-network 502 includes APs 508*a* and 508*b*, and sub-network 506 includes APs 510*a* and 510*b*. In this example, a WU 512 is in position "A" and is associated with AP 508*b* for communicating with sub-network 502.

In this example, WU 512 begins to move toward position "B" and now it receives the beacons emitted by AP 510*a* which is on a different sub-network 510*a*. As will be further discussed below, the beacons include information from which a WU can assess the signal quality of the wireless communications to the AP. A WU uses this information to determine whether it should stay on its current AP or roam to another AP that has a communications link with better signal quality. For instance, in the example of FIG. 5, WU 512 has a better signal quality to AP 510*a* than to 508*b*. If AP 510*a* were on the same sub-network as AP 508*b*, then WU 512 would normally disassociate itself with AP 508*b* and associate itself with AP 510*a*. However, since AP 510*a* is on a different sub-network than AP 508*b*, roaming to AP 510*a* may not be desirable because there may be some adverse effects and requires additional processing due to the change in sub-networks. For instance, all open application connections involving network protocol transfers need to be closed and reopened, and the WU needs to send a request to release its old network protocol address to sub-network 502 and a request for a new network protocol address to sub-network 506.

Accordingly, another aspect of the invention is to give a user of a WU control over whether the WU should roam to an AP on another sub-network. In the preferred embodiment, the WU provides the user with three options with regard to whether the WU should roam to an AP on a different sub-network. The first option is to roam freely across sub-networks. With this option, a WU makes the normal roaming decisions which are primarily based on signal quality to an AP. The second option is to stay on the current subnet when possible. With this option, the signal quality to an AP on a different sub-network is reduced by a certain factor (e.g. 0.7×signal quality). In this situation, the signal quality to an AP on a different sub-network has to be substantially better, not merely better, than the signal quality to the current AP in order for the WU to roam to it. The third option is to always stay on the current subnet. With this option, the signal quality to an AP on a different sub-network is reduced to zero, and therefore, the WU will not roam to an AP on a different sub-network.

Figure 6:
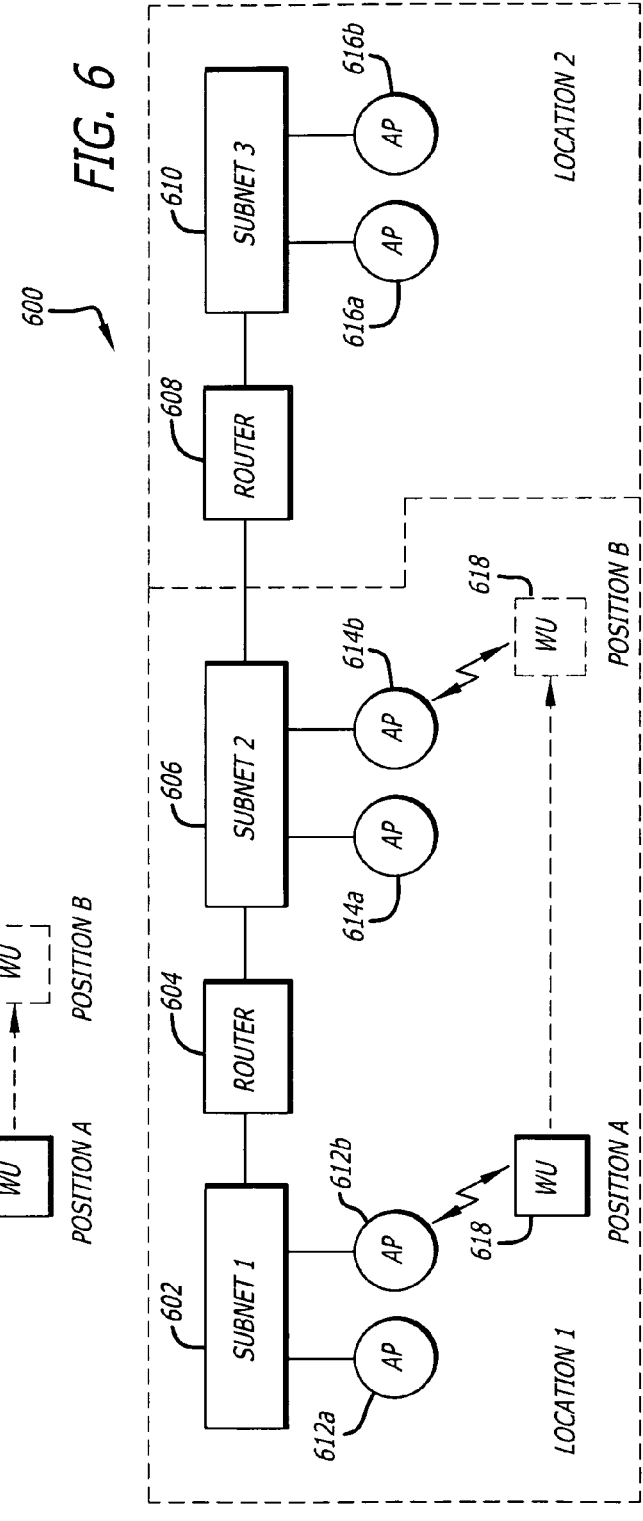
FIG. 6 illustrates a block diagram of an exemplary wireless network system that includes two sub-networks in a first location and a third sub-network in a second location, and a WU roaming within the ranges common to APs on different sub-networks in different locations in accordance with the invention.

FIG. 6 illustrates a block diagram of yet another exemplary wireless network system 600 with multiple sub-networks. The wireless network system 600 is used to illustrate yet another aspect of the invention. Specifically, the wireless network system 600 comprises a first sub-network 602, a second sub-network 606, and a third sub-network 610. A network device, such as router 604, data couples the first and second sub-networks 604, and another network device, such as router 608 data couples the second and third sub-networks 606 and 610. Sub-network 602 includes two APs 612a–b, sub-network 606 includes APs 614a–b, and sub-network 610 includes APs 616a–b. Sub-networks 602, router 604, and sub-network 606 may be physically located within location "1" that is different than the location "2" where router 608 and sub-network 610 are located. In this example, a WU 618 is in position "A" and is associated with AP 612b for communicating with sub-network 602.

This exemplary wireless network system 600 is used to illustrate that there may be situations where the WU should roam freely between APs on certain different sub-networks, but not so freely (e.g. signal quality reduced by a factor) or even restricted (e.g. signal quality reduced to zero) from roaming to an AP of a certain sub-network. For instance, in wireless network system 600, WU 618 can be configured to roam freely between APs (i.e. APs 612a–b and 614a–b) on sub-networks 602 and 606, and not so freely or restricted to APs (i.e. APs 616a–b) on sub-network 610. As shown in FIG. 6, WU 618 being in position "B" may have a better signal quality to AP 616a than to 614b. But, since in this example, roaming to AP 616a may be restricted or artificially degraded, WU 618 maintains its association with AP 614b.

One reason for doing this is that sub-networks 602 and 606 may be both located on the same floor of a building, while sub-network 610 is located on a higher or lower floor. Since the RF signal generated by APs can traverse floors, a WU at a particular spot may have a better signal quality to an AP on an adjacent floor than on the APs on the same floor. But because there may be lots of structures in between floors that may interfere with the RF signal, it would be desirable for the WU to associate freely with APs on the same floor although they may be on different sub-networks, and to not roam to an AP on a different floor to prevent possible RF interference problems. Another reason may be that some sub-networks may be restricted only to certain users.

This classification of sub-networks for the purpose of whether a WU should roam can be accomplished in many ways. For instance, APs can transmit a multicast data packet including a code that indicates the location of the corresponding sub-network or a code identifying whether the sub-network is restricted to certain users for security purposes. Based on these codes, a WU can determine whether it is free to roam to the sub-network, not so free to roam to the sub-network, or restricted from roaming to the sub-network. Other methods of implementing this are possible.

Figure 7:
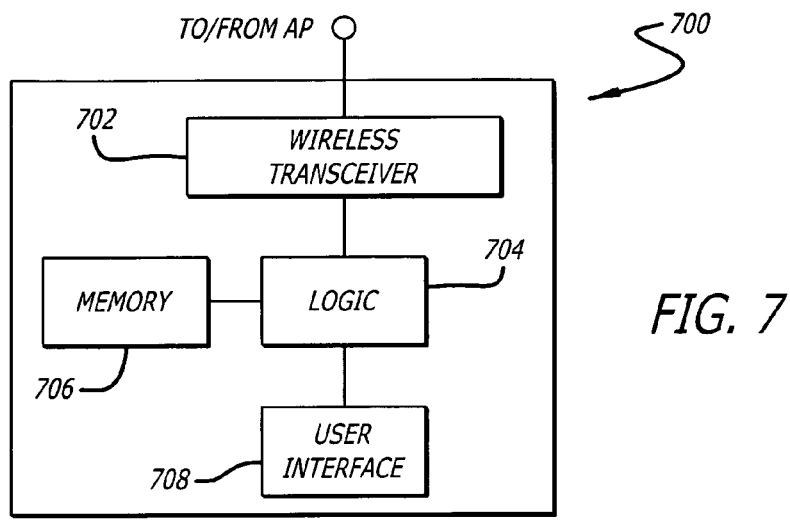
FIG. 7 illustrates a block diagram of an exemplary WU in accordance with the invention.

FIG. 7 illustrates a block diagram of an exemplary wireless unit (WU) 700 for performing the various functions in accordance with the invention. As previously discussed, examples of WU 700 include a computer (e.g., desktop computer, laptop computer, hand-held computer such as a personal digital assistant "PDA", etc.), communications equipment (e.g., pagers, telephones, facsimile machine, etc.), a television set-top box, or appliances such as refrigerator pads, electronic picture frames, alarm detectors, water detectors, etc. The WU 700 comprises a wireless transceiver 702 for transmitting and receiving RF data packets to and from an AP, a logic circuit 704 for performing the various functions of the WU 700, a memory 706 for storing data and applications relating to the various functions of the WU 700, and a user interface 708 for receiving and transmitting information from and to a user of the WU 700. Such user interface 708 can include a keyboard, pointing device (e.g. a mouse, a track ball, etc.), a microphone, display, speakers and other devices of conveying and receiving information to and from a user.

With regard to the invention, the WU 700 is capable of receiving beacons and the multicast data packet including the network protocol address and subnet mask of a candidate AP through the wireless transceiver 702. The logic circuit 704 receives the multicast data packet and extracts the network protocol address and subnet mask of the candidate AP and stores it in memory 706 along with the MAC address if it has not been previously stored. The logic circuit 704 can generate and transmit through the wireless transceiver 702 a request to release its current network protocol message to, for example, a DHCP server on the current sub-network by way of the current AP, and a request for a new network protocol address message to, for example, a DHCP server on the sub-network associated with the candidate AP. The logic circuit 704 generates these messages when it compares the received network protocol address and subnet mask of the candidate AP to the previously stored network protocol address and subnet masks of APs the WU has previously roamed to, and from that comparison determines that the candidate is on a different sub-network than the current AP, or that the received MAC address has not been previously stored in memory 706.

The WU 700 of the invention, and specifically the logic circuit 704, can receive signal quality information from current and candidate APs, for example by way of their beacons. The logic circuit 704 can make roaming decisions based on this information. In addition, the logic circuit 704 can present to the user of the WU 700 by way of the user interface 708 options such as the roaming control options previously described, i.e. roam freely across sub-networks option, stay on current subnet when possible option, and always stay on current subnet option. The logic circuit 704 alters its normal roaming decisions if the user selects the stay on current subnet when possible option or always stay on current subnet option as previously discussed. The logic circuit 704 can also alter normal roaming decisions by receiving information from a candidate AP as to its physical location code, permitted user code, or other factors.

Figure 8:
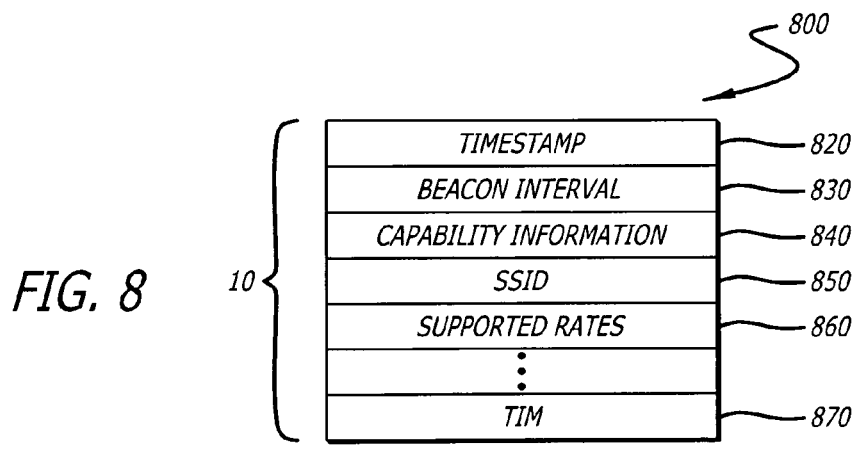
FIG. 8 illustrates an exemplary embodiment of a data structure of a beacon.

Referring now to FIG. 8, an exemplary embodiment of the data structure of a beacon 800 is shown. In accordance with Section 7.2.3.1 of IEEE 802.11, one embodiment of the beacon 800 is a control frame transmitted from an AP to one or more WUs. The beacon 800 comprises a plurality of information elements 810, namely specific data forming the beacon 800. These information elements 810 include a timestamp element 820, a beacon interval element 830, a capability information element 840, a service set identity (SSID) element 850, a supported rates element 860 and a traffic indication map (TIM) 870 as shown in FIG. 9, plus the MAC address of the AP, which in inherent in the header.

Figure 9:
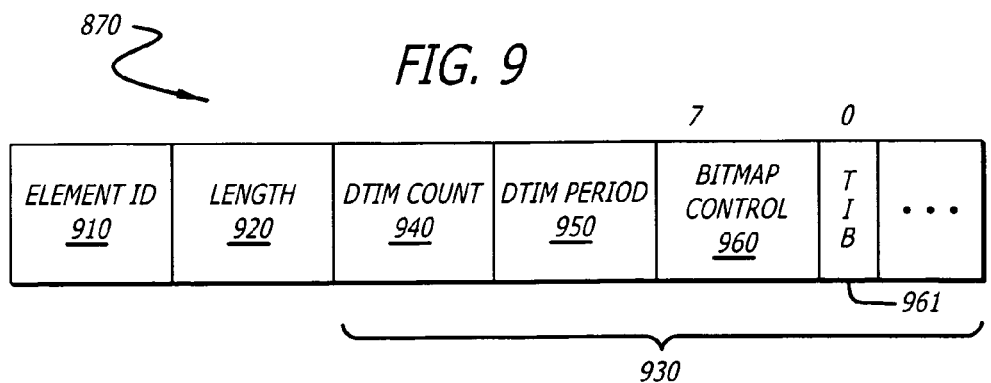
FIG. 9 illustrates an exemplary embodiment of the TIM element of the beacon of FIG. 8.

Referring to FIG. 9, an exemplary embodiment of the TIM information element 870 is shown. The TIM information element 870 comprises (1) an Element Identification (ID) field 910, (2) a Length field 920 and (3) one or more element-specific Information fields 930. The Element ID field 910 contains a unique value to identify the specific type of information element while the Length field 920 specifies the number of octets in the Information field(s) 930.

Information fields 930 comprise at least a delivery TIM (DTIM) Count field 940, a DTIM Period field 950 and a Bitmap Control field 960. The DTIM Count field 940 is a single octet that indicates how many TIMs (including the current frame) appear before the next DTIM. If the value of the DTIM Count field 940 is zero, the beacon is a DTIM. The DTIM Period field 950 is a single octet that indicates the number of TIM intervals between successive DTIMs. The Bitmap Control field 960 is a single octet that includes a traffic indicator bit (bit 0) 961. When one or more broadcast or multicast data frames are buffered at the AP, the DTIM Count field 940 is zero and the traffic indicator bit (TIB) 961 is set. Hence, upon receipt of the beacon 800, any wireless unit is aware that one or more data frames will be broadcast subsequent to the DTIM.

Figure 10:
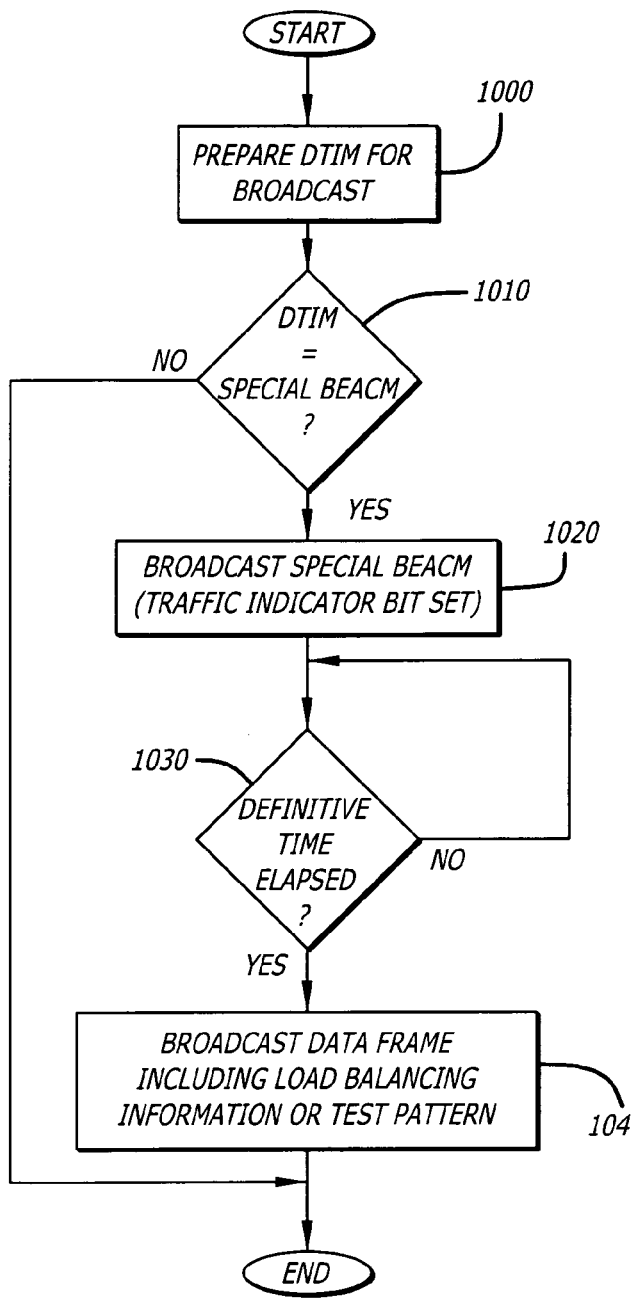
FIG. 10 illustrates an exemplary embodiment of the operations of an AP in full compliance with IEEE 802.11.
Figure 11:
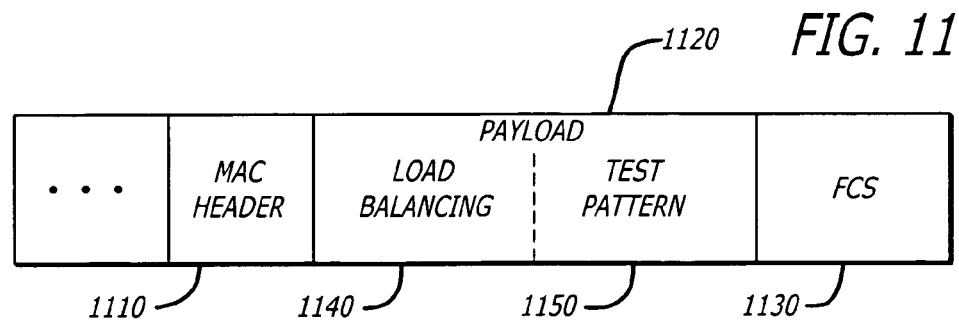
FIG. 11 illustrates an exemplary embodiment of a data frame transmitted after a special DTIM beacon.

Referring now to FIGS. 10 and 11, an exemplary embodiment of the operations of a device, for example, an AP in accordance with the invention, is shown. As shown in FIG. 10, an AP prepares a DTIM beacon for broadcast to the wireless units (block 1000). For each DTIM beacon or perhaps selectively chosen DTIM beacons (referred to as a "special DTIM beacon") as shown, the traffic indicator bit will be set (block 1010). The selection may be random, pseudo-random or in accordance with a predetermined, alternating pattern. Thereafter, upon completing the broadcast of the special DTIM beacon (block 1020), the AP broadcasts a data frame that includes load balancing information and/or a test pattern as described below and shown in FIG. 11 (blocks 1040). In this embodiment, the AP broadcasts the data frame after a definitive time period has elapsed since the special DTIM beacon was broadcast (block 1030). For example, the data frame may be a first frame that is broadcast after the special DTIM beacon. This reduces the amount of time that the wireless units must remain powered-on and tuned to a certain channel in the event that the wireless unit is in a power-save mode.

As shown in FIG. 11, an exemplary embodiment of the data frame is shown. The data frame 1100 includes a media access control (MAC) header 1110, a payload 1120 and a frame check sequence (FCS) 1130. The payload 1120 includes load balancing information 1140 and/or a test pattern 1150.

More specifically, the load balancing information 740 is data that provides, among other things, certain characteristics of the wireless units in communication with any given AP. This data may include, but is not limited or restricted to the following: a count of the number of WUs currently associated with the AP, a count of associated WUs that are "busy" (sending/receiving data at a rate or volume that exceeds a threshold), an indicator as to whether the AP is able to access any additional WUs, an indicator of the total utilization level of the AP, number of (wireless) hops to the wired backbone network, speed of the uplink from the AP to the backbone network, and/or memory capacity for buffering. Load balancing is possible because each wireless unit registers with its selected AP and the selected AP maintains a list of the wireless units that it is servicing in its address table.

The test pattern 1150 is a static bit pattern, which allows wireless units to calculate the quality of a radio signal from the AP by comparing the received test pattern to an actual pattern stored in its internal memory to assist in roaming decisions. Of course, non-receipt of the test pattern conveys useful information as to the quality of the radio signal as well.

In the foregoing specification, the invention has been described with reference to specific embodiments thereof. It will, however, be evident that various modifications and changes may be made thereto departing from the broader spirit and scope of the invention. The specification and drawings are, accordingly, to be regarded in an illustrative rather than a restrictive sense.

The invention claimed is:

1. In a wireless network system comprising a wireless unit, a first sub-network including a plurality of access points and a second sub-network including at least a second access point, a method comprising:
   receiving data packets by the wireless unit, each of the data packets originating from one of the plurality of access points of the first sub-network and is transmitted to the wireless unit via a first access point of the plurality of access points in communication with the wireless unit, each data packet including a media access control (MAC) address and a corresponding network protocol address for an access point from which that data packet originated;
   storing the MAC address and the network protocol address by the wireless unit;
   receiving information from a second access point by the wireless unit; and
   based on the information, determining by the wireless unit that the second access point is part of the second sub-network prior to the wireless unit associating with the second access point.

2. The method of claim 1, wherein the information received by the wireless unit from the second access point is a beacon including a MAC address of the second access point.

3. The method of claim 1, wherein each data packet received by the wireless unit further comprises a subnet mask pertaining to the first sub-network.

4. The method of claim 1 further comprising releasing a current network protocol address of the wireless unit for the first sub-network.

5. The method of claim 4 further comprising obtaining a new network protocol address of the wireless unit for the second sub-network.

6. The method of claim 1, wherein prior to receiving the data packets, the method further comprising:
   transmitting the data packets as multicast packets from the plurality of access points forming the first sub-network; and
   transmitting of the multicast packets by the first access point to the wireless unit.

7. The method of claim 1 further comprising:
   associating with the second access point by the wireless unit for communicating with the second sub-network;
   sending a request for a new network protocol address by the wireless unit, the new network protocol address differing from a current network protocol address used by the wireless unit for the first sub-network; and
   receiving the new network protocol address by the wireless unit from the second sub-network via the second access point.

8. The wireless unit of claim 1, wherein prior to receiving the data packets, the method further comprising:
programming the wireless unit to roam freely across sub-networks so that the wireless unit associates with the second access point of the second sub-network upon determining that a signal quality from the second access point is superior to signal quality of communications from the first access point.

9. The wireless unit of claim 1, wherein prior to receiving the data packets, the method further comprising:
programming the wireless unit to maintain communications with a current sub-network being the first sub-network unless a signal quality of communications with the second access point of the second sub-network substantially exceeds a signal quality of communications with the first access point of the first sub-network by a predetermined factor.

10. The wireless unit of claim 9, wherein the wireless unit maintains communications with the first sub-network if the signal quality of communications with the first access point is greater than 0.7 times the signal quality of communications with the second access point.

11. The wireless unit of claim 1, wherein prior to receiving the data packets, the method further comprising:
programming the wireless unit to always maintain communications with a current sub-network being the first sub-network and, as a result, avoiding association with the second access point of the second sub-network.

12. A wireless unit for communicating with a wired backbone network including a first sub-network and a second sub-network, comprising:
a wireless transceiver;
a memory to store a media access control (MAC) address and a corresponding network protocol address for multiple access points of the first sub-network being information recovered from data packets received by the wireless transceiver; and
a logic circuit to receive information including a MAC address of a first access point received by the wireless transceiver, the logic unit being able to determine whether the first access point is part of the second sub-network prior to the wireless unit associating with the first access point.

13. The wireless unit of claim 12, wherein the memory further stores a current network protocol address of a second access point of the first sub-network used by the wireless unit for communications with the first sub-network.

14. The wireless unit of claim 12, wherein the logic unit determines whether the first access point is part of the second sub-network prior to the wireless unit associating with the first access point through analysis of the MAC addresses stored in the memory.

15. The wireless unit of claim 13, wherein the logic unit is further adapted to transmit a request for a new network protocol address if the logic circuit determines that the first access point is part of the second sub-network and associates with the first access point.

16. The wireless unit of claim 15, wherein the logic circuit is adapted to transmit a request to release the current network protocol address prior to transmission of the request for the new network protocol address.

17. The wireless unit of claim 13 using the current network protocol address if the logic unit determines that the first access point is part of the first sub-network prior to the wireless unit associating with the first access point.

18. A wireless network system, comprising:
a first sub-network including at least a first access point;
a second sub-network including at least a second access point, the second sub-network in communication with the first sub-network over a link; and
a wireless unit currently in communication with the first access point of the first sub-network, the wireless unit comprises
a wireless transceiver,
a memory to store a media access control (MAC) address and a corresponding network protocol address for access points of the first sub-network recovered from data packets received by the wireless transceiver, and
a logic circuit to receive information includes a MAC address of the second access point via the wireless transceiver, the logic unit comparing the MAC address of the second access point with stored MAC addresses and determining that the second access point is part of the second sub-network prior to the wireless unit associating with the second access point.

19. The wireless network system of claim 18, wherein the information received by the logic circuit of the wireless network includes a beacon that comprises the MAC address of the second access point.

20. The wireless network system of claim 18, wherein the memory of the wireless unit further comprises a subnet mask corresponding to the MAC address and network protocol address of each access point of the first sub-network.

21. In a wireless network system comprising a wireless unit, a first sub-network including a plurality of access points and a second sub-network including at least a second access point, a method comprising:
receiving multicast data packets by the wireless unit, each of the data packets originating from a separate access point of the plurality of access points of the first sub-network and including a media access control (MAC) address and a corresponding network protocol address for an access point;
storing the MAC address and the network protocol address by the wireless unit; and
upon receiving a beacon from a second access point by the wireless unit, determining by the wireless unit whether the second access point is part of the second sub-network prior to the wireless unit associating with the second access point by comparing a MAC address of the second access point with MAC addresses stored by the wireless unit.

* * * * *